April 21, 1925.
L. E. RIVAS
EIGHT-WHEEL VEHICLE
Filed Oct. 17, 1923
1,534,810
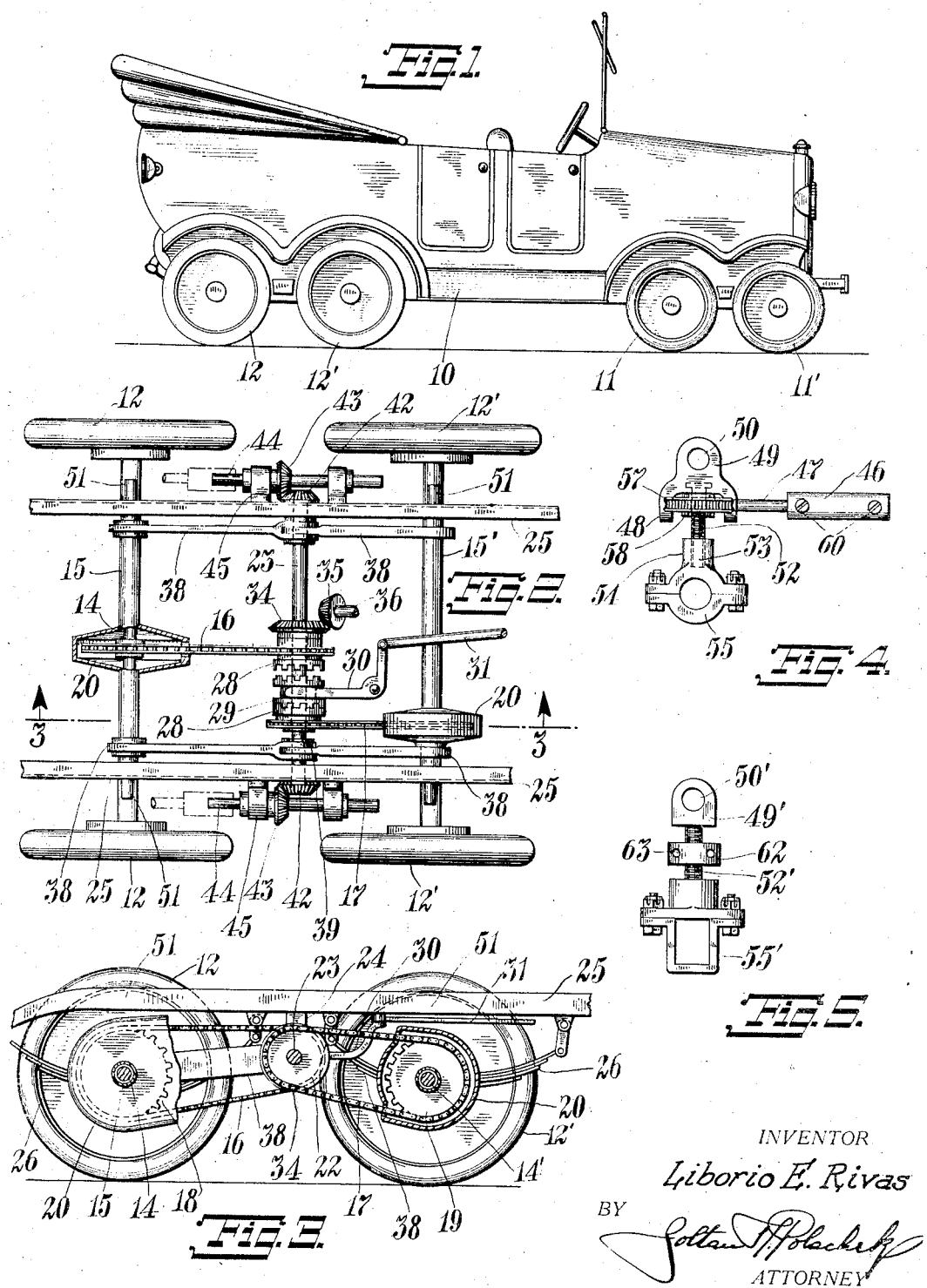
INVENTOR
Liborio E. Rivas
BY
ATTORNEY Patented Apr. 21, 1925.

1,534,810

UNITED STATES PATENT OFFICE.

LIBORIO E. RIVAS, OF SANTA RITA, NEW MEXICO.

EIGHT-WHEEL VEHICLE.

Application filed October 17, 1923. Serial No. 669,025.

*To all whom it may concern:*

Be it known that I, LIBORIO E. RIVAS, a citizen of the United States, residing at Santa Rita, in the county of Grant and State of New Mexico, have invented certain new and useful Improvements in Eight-Wheel Vehicles, of which the following is a specification.

This invention relates generally to automobiles, having more particular reference to an automobile provided with eight wheels whereby an additional safety factor is provided and which renders unnecessary the changing of tires in the event of a puncture.

The invention has for an object the provision of a novel automobile of the above type having means for taking the weight off any desired pair of wheels.

For further comprehension of the invention, and of the objects and advantages thereof, reference will be had to the following description and accompanying drawings, and to the appended claim in which the various novel features of the invention are more particularly set forth.

Fig. 1 of the drawings is a side view of an automobile having the invention applied thereto.

Fig. 2 is a fragmentary plan view of the chassis, with parts in horizontal section.

Fig. 3 is a longitudinal vertical sectional view taken on the line 3—3 of Fig. 2.

Fig. 4 is a side view of the element for raising and supporting the back wheels.

Fig. 5 is a like view of the element for raising and supporting the front wheels.

Referring now to the drawings, the reference numeral 10 indicates the body of my improved automobile which may be of usual construction, the invention being intended more particularly for application to large automobiles adapted to hold a considerable number of passengers. According to my invention I provide two pair of front wheels indicated at 11 and 11' respectively, and two pair of rear wheels, indicated at 12 and 12' respectively.

Referring more particularly now to the arrangement of the rear wheels, the latter are fixed on axles 14 and 14' enclosed in sleeves 15 and 15'. These axles are adapted to be selectively driven by means of sprocket chains 16 and 17 looped over suitable sprockets 18 and 19 on the respective axles, these sprocket wheels being enclosed in suitable housings 20 on the respective sleeves. The chains are looped at their other ends over suitable sprocket wheels such as 22 loose on a transverse shaft 23 located between the shafts 14 and 14', and supported at its ends in bearing elements such as 24 depending from the usual side frame members 25, the springs to which the axles are fastened being indicated at 26. Formed on the sprocket wheels 22 are clutch elements 28 adapted to be engaged by a clutch sleeve 29 feathered on the shaft 23 and adjustable therealong by means of a lever 30 engaging the sleeve in a well known manner and having connected thereto a link 31 which leads forward to a suitable operating lever, not shown, whereby the clutch sleeve may be adjusted.

Fixed to the shaft 23 is a bevel gear 34 which is engaged by a bevel pinion 35 on the rear end of the usual drive shaft 36 which leads backward from the transmission mechanism of the automobile. As will be apparent, by adjusting the clutch sleeve 29 either pair of rear wheels can be driven from the automobile motor. To hold the shafts 14 and 14' at all times at the same distance from the shaft 23 pairs of links 38 are freely engaged at one end with bosses 39 projected from the bearing elements 24 and at their opposite ends with the sleeves 15, 15' in which the shafts are enclosed.

In the event of puncture of a tire on any of the rear wheels the shaft on which said wheel is mounted may be drawn up close enough to the automobile body to raise the wheel sufficiently to prevent the weight of the automobile bearing thereon. As here shown I fix on the ends of the shaft 23 the bevel pinions 42 which mesh with like pinions 43 on stub shafts 44 extending along the side frames and supported by bearing elements 45 on the latter. These stub shafts are adapted to be detachably engaged by axle raising devices such as shown in Fig. 4. Each of these devices comprises a sleeve 46 carried by a shaft 47 mounted in extensions 48 from a head 49 in which is an eye 50. This eye is adapted to be inserted over a stud 51 fixed to the side frame member 25. The head 49 has swiveled therein a screw 52 which projects into a socket 53 formed in a boss 54 projecting upwardly from a split collar 55 which is adapted to be removably engaged with the desired sleeve 15 or 15'. Upon the screw 52 is a worm gear 57 with which a worm pinion 58 on the shaft 47 meshes. One of these devices is mounted on both sides of the automobile. When it is desired to raise one pair of wheels the collar 55 is engaged with the proper axle sleeve and the head 49 with the pin 51, the sleeve 46 being then clamped, as by the screws 60, on the shafts 44 and 47. The clutch 29 is then shifted to neutral position and the motor started. The desired shaft will then be drawn upward sufficiently to take the weight of the wheels off said shaft.

For raising a desired pair of the front wheels I may provide the device shown in Fig. 5 which comprises the head 49' in which is an eye 50' adapted to be engaged with a stud, similar to the stud 51, on the side frame member of the automobile, and a split collar 55' adapted to be engaged with the front axle of the automobile. These members are formed with suitable sockets in which are engaged the ends of the right and left hand screw 52' formed with an enlarged midsection 62 provided with suitable sockets 63 to receive a turning tool.

Having thus described my invention, what I claim as new and desire to protect by Letters Patent of the United States is as follows:

An automobile provided with two pairs of rear wheels, drive means for selectively driving either pair of wheels, said drive means including a transverse shaft, a contractible element adapted to be detachably connected at opposite ends with the wheels and the automobile frame, and means whereby said element may be contracted by rotation of said shaft, said contractible element comprising a head formed with a transverse aperture, a screw swiveled in said head and depending therefrom, a split collar having a threaded socket in which said screw engages, a worm gear fixed on said screw, a worm pinion meshing with said worm gear, a stub shaft on which said worm pinion is fixed, and a coupler member on said stub shaft.

In testimony whereof I have affixed my signature.

LIBORIO E. RIVAS.